(12) United States Patent
Darsy et al.

(10) Patent No.: US 10,744,820 B2
(45) Date of Patent: Aug. 18, 2020

(54) AIRCRAFT WHEEL

(71) Applicant: SAFRAN LANDING SYSTEMS, Velizy Villacoublay (FR)

(72) Inventors: Jerome Darsy, Antony (FR); Xavier Delayre, Velizy-Villacoublay (FR); Celine Colonna, Briis sous Forges (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 418 days.

(21) Appl. No.: 15/591,315

(22) Filed: May 10, 2017

(65) Prior Publication Data
US 2017/0326911 A1    Nov. 16, 2017

(30) Foreign Application Priority Data
May 11, 2016 (FR) .................... 16 54207

(51) Int. Cl.
| | | |
|---|---|---|
| *B60B 25/00* | (2006.01) | |
| *B60B 25/22* | (2006.01) | |
| *B60B 3/00* | (2006.01) | |
| *B64C 25/36* | (2006.01) | |

(52) U.S. Cl.
CPC .............. *B60B 25/008* (2013.01); *B60B 3/00* (2013.01); *B60B 25/004* (2013.01); *B60B 25/22* (2013.01); *B64C 25/36* (2013.01); *B60B 2310/616* (2013.01); *B60B 2310/621* (2013.01); *B60B 2360/102* (2013.01); *B60B 2360/30* (2013.01); *B60B 2900/141* (2013.01); *B60B 2900/212* (2013.01); *B60B 2900/561* (2013.01); *B60Y 2200/50* (2013.01)

(58) Field of Classification Search
CPC ....... B60B 25/008; B60B 3/00; B60B 25/004; B60B 25/22; B60B 2310/616; B60B 2900/141; B60B 2360/102; B60B 2360/30; B60B 2900/212; B60B 2900/561; B60B 2310/621; B64C 25/36; B60Y 2200/50
USPC ........................................................ 301/35.1
See application file for complete search history.

(56) References Cited

U.S. PATENT DOCUMENTS 3,143,376 A  *  8/1964  Di Federico ............ B60B 11/06
                                                      301/13.2
3,983,959 A  *  10/1976  Satzinger .................. C25B 9/06
                                                      184/39

(Continued)

FOREIGN PATENT DOCUMENTS

DE    20 2012 101 252 U1    7/2013
EP         2 923 858 A1      9/2015

(Continued)

OTHER PUBLICATIONS

Search Report for FR 1654207 dated Jan. 17, 2017.
Written Opinion for FR 1654207 dated Jan. 17, 2017.

*Primary Examiner* — S. Joseph Morano
*Assistant Examiner* — Jean W Charleston
(74) *Attorney, Agent, or Firm* — Sughrue Mion, PLLC

(57) ABSTRACT

An aircraft wheel including a rim (2) comprising two assembled-together rim halves (3a, 3b), each rim half (3a, 3b) having a bearing surface (7) extending in a plane perpendicular to an axis of rotation (X) of the aircraft wheel. The aircraft wheel further includes a spacer (9) situated between the two bearing surfaces (7) when the rim halves (3a, 3b) are assembled together.

18 Claims, 1 Drawing Sheet

(56) References Cited

U.S. PATENT DOCUMENTS

| | | | | |
|---|---|---|---|---|
| 4,640,330 | A | * | 2/1987 | Frassica ............... B60B 3/085 |
| | | | | 152/404 |
| 5,485,898 | A | * | 1/1996 | Patko ................... F16D 55/36 |
| | | | | 188/18 A |
| 6,000,762 | A | * | 12/1999 | Chang ................... B60B 3/08 |
| | | | | 152/DIG. 10 |
| 6,024,413 | A | * | 2/2000 | Dixon ................... B60B 1/041 |
| | | | | 301/110.5 |
| 2003/0080609 | A1 | * | 5/2003 | Darnell ................. B60B 5/02 |
| | | | | 301/95.11 |
| 2010/0038957 | A1 | * | 2/2010 | Henline ................ B60B 3/08 |
| | | | | 301/37.28 |
| 2010/0147428 | A1 | * | 6/2010 | Lipper .................. B60B 3/08 |
| | | | | 152/399 |
| 2010/0225156 | A1 | * | 9/2010 | Lipper .................. B60B 3/06 |
| | | | | 301/29.2 |
| 2011/0018335 | A1 | * | 1/2011 | Hodges ................. B60B 1/06 |
| | | | | 301/37.24 |
| 2011/0174522 | A1 | * | 7/2011 | Simmons ............... B32B 5/26 |
| | | | | 174/122 R |
| 2012/0235465 | A1 | * | 9/2012 | Kuttner ................. B60B 3/002 |
| | | | | 301/64.302 |
| 2015/0273938 | A1 | * | 10/2015 | Delayre ............... B60B 25/006 |
| | | | | 301/95.11 |
| 2018/0002825 | A1 | * | 1/2018 | Balaraju ............... C25D 11/08 |

FOREIGN PATENT DOCUMENTS

| | | | |
|---|---|---|---|
| JP | 55-48543 U | 3/1980 | |
| JP | 2008223775 A | * 9/2008 | ............ F16C 35/067 |

* cited by examiner

AIRCRAFT WHEEL

The invention relates to the field of aircraft wheels.

BACKGROUND OF THE INVENTION

Aircraft wheels are known that include a rim and a tire received on the rim, the rim comprising two rim halves that are assembled together by means of bolts that are regularly spaced apart.

Each rim half, which is made of an aluminum alloy, conventionally has a bearing surface that extends in a plane perpendicular to an axis of rotation of the wheel. When the rim is assembled, the bearing surfaces of the rim halves are positioned one against the other. Each rim half then exerts considerable compression on the bearing surface of the other rim half. As a result of this considerable compression, the coefficient of friction between the bearing surfaces is high.

However, while the wheel is rotating, the various peripheral zones of the tire and of the rim are subjected to loading and to rest in alternation. Under such circumstances, the rim halves are then subjected to radial and peripheral micro-movements relative to each other, which micro-movements can be considered as creeping motion.

The coefficient of friction between the bearing surfaces of the rim halves is such that the radial and peripheral micro-movements lead to a protective coating on the bearing surfaces becoming torn off progressively. The bare aluminum bearing surfaces are then subjected to a phenomenon of fretting under tension, which damages the bare bearing surfaces and leads to cracks being formed.

Thus, when changing a tire, it is often necessary either to rework the bare bearing surfaces by machining and to reapply the protective coating, or else, in the event that it is observed that cracking has started, to replace the rim half in question since it is no longer reusable. The maintenance costs associated with these operations are relatively high.

OBJECT OF THE INVENTION

An object of the invention is to reduce the maintenance costs associated with an aircraft wheel.

SUMMARY OF THE INVENTION

In order to achieve this object, there is provided an aircraft wheel including a rim comprising two assembled-together rim halves, each rim half having a bearing surface extending in a plane perpendicular to an axis of rotation of the aircraft wheel. According to the invention, the aircraft wheel further includes a spacer situated between the two bearing surfaces when the rim halves are assembled together.

The spacer serves to limit the extent to which coatings on the bearing surfaces are torn off. The maintenance costs that result from inspecting, repainting, or indeed replacing one or both wheel halves are thus reduced.

Other characteristics and advantages of the invention appear on reading the following description of particular, nonlimiting embodiments of the invention.

BRIEF DESCRIPTION OF THE DRAWING

Reference is made to the accompanying drawing, in which.

DETAILED DESCRIPTION OF THE INVENTION

Figure 1:
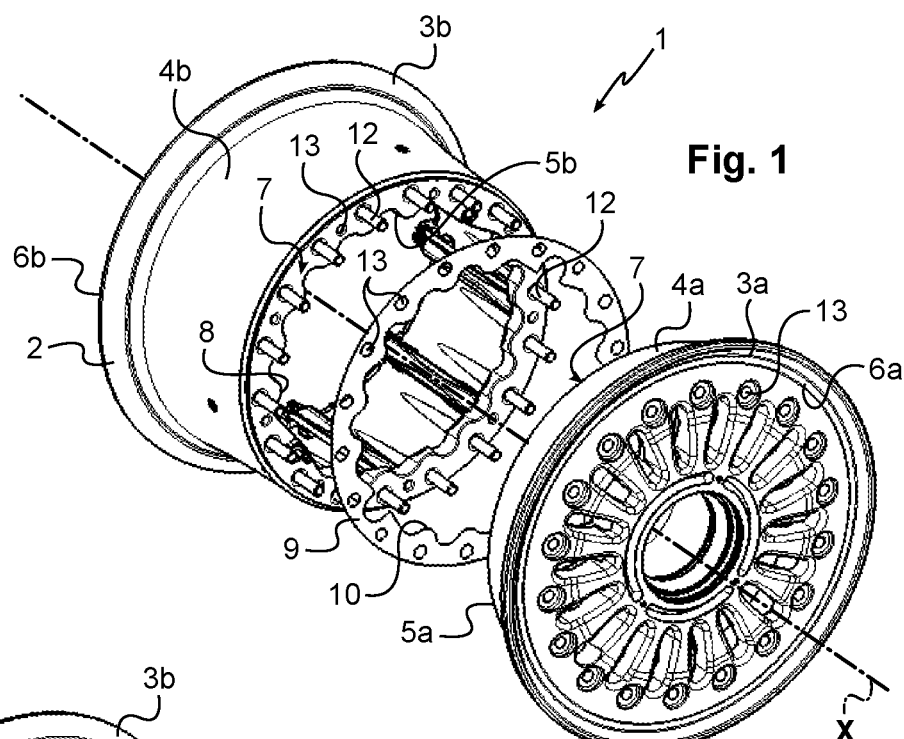
FIG. 1 is a perspective view of a non-assembled rim of an aircraft wheel in a first embodiment of the invention.
Figure 2:
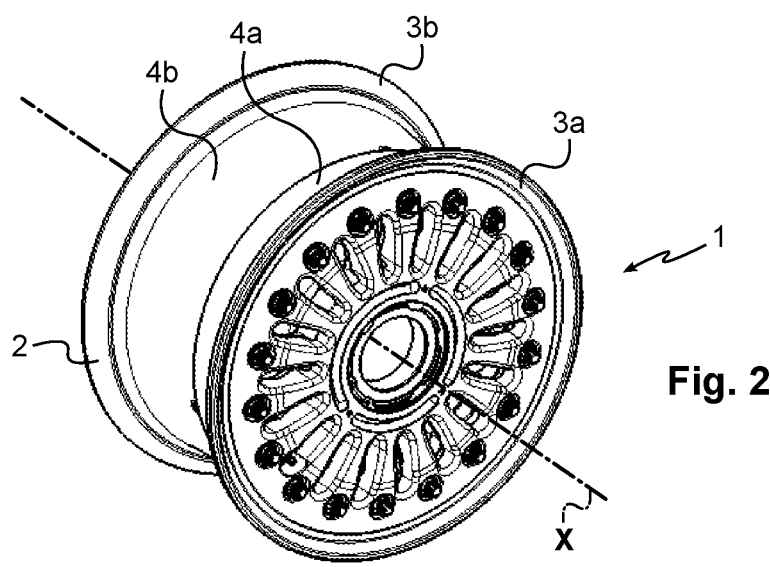
FIG. 2 is a perspective view of the rim when assembled.
Figure 3:
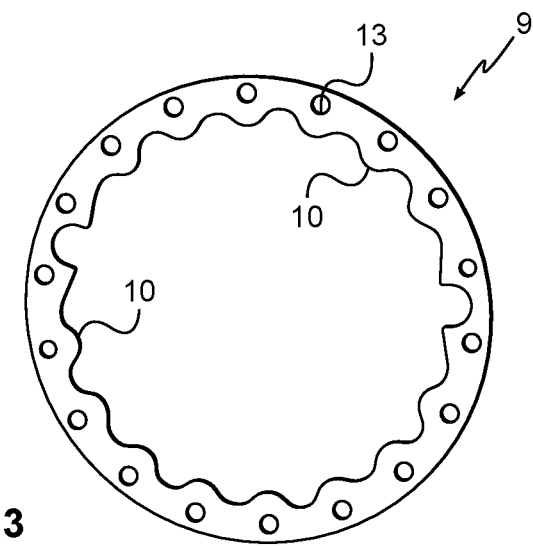
FIG. 3 shows a spacer of the aircraft wheel in the first embodiment of the invention.

With reference to the figures, the aircraft wheel 1 of the first embodiment of the invention includes a rim 2 that is to receive a tire (not shown). The rim 2 is made of aluminum alloy and comprises a first rim half 3a and a second rim half 3b that are assembled together.

The first rim half 3a comprises an annular portion 4a that extends between an inside end 5a and an outside end 6a of the first rim half 3a. An outside face of the rim 2 extends at the outside end 6a of the first rim half 3a The second rim half 3b comprises an annular portion 4b presenting a length that is greater than the length of the annular portion 4a of the first rim half 3a, and that extends between and inside end 5b and an outside end 6b of the second rim half 3b. The outside end 6b of the second rim half 3b defines an opening through which a stack of friction disks of a brake for the aircraft wheel 1 can extend.

The first rim half 3a and the second rim half 3b further include respective bearing surfaces 7.

The bearing surface 7 of the first rim half 3a is situated at the inside end 5a of the first rim half 3a and extends in a plane perpendicular to an axis of rotation X of the aircraft wheel 1. The bearing surface 7 of the first rim half 3a forms a shoulder that extends from the annular portion 4a of the first rim half 3a towards the axis of rotation X of the aircraft wheel 1, and that presents undulations 8 facing towards the axis of rotation X of the aircraft wheel 1.

Likewise, the bearing surface 7 of the second rim half 3b is situated at the inside end 5b of the second rim half 3b and extends in a plane perpendicular to an axis of rotation X of the aircraft wheel 1. The bearing surface 7 of the first rim half 3a forms a shoulder that extends from the annular portion 4a of the first rim half 3a towards the axis of rotation X of the aircraft wheel 1, and that presents undulations facing towards the axis of rotation X of the aircraft wheel 1.

At the time of fabrication of the first rim half 3a and of the second rim half 3b, each bearing surface 7 is treated with anodizing of the sulfuric acid anodizing (SAA) type. Each bearing surface 7 is also coated in a layer of primer paint and a layer of finish paint.

The aircraft wheel 1 also has a spacer 9 that is in the form of a flat ring including undulations 10 facing towards the center of the spacer 9.

The spacer 9 is positioned between the two bearing surfaces 7 when the first and second rim portions 3a and 3b are assembled together (and also with the spacer 9). The spacer 9 that extends over all of each bearing surface 7. In particular, the undulations 10 of the spacer 9 correspond to the undulations 8 of the bearing surface 7 of the first rim half 3a and to the undulations of the bearing surface 7 of the second rim half 3b.

The first rim half 3a, the second rim half 3b, and the spacer 9 are assembled together and held clamped together by means of bolt fasteners, each comprising an assembly bolt 12, a washer, and a nut. For this purpose, the first rim half 3a, the second rim half 3b, and the spacer 9 include fastener orifices 13.

The assembly bolts 12 extend through the fastener orifices 13 in the first rim half 3a, in the second rim half 3b, and in the spacer 9. The spacer 9 is thus held in angular position by the assembly bolts 12.

In this example, the spacer 9 is made of stainless steel of the X5CNi18-10 (304L) type.

In this example, the thickness of the spacer 9 lies in the range 0.05 millimeters (mm) to 0.25 mm.

Each of the faces of the spacer 9 presents a bright surface finish similar to the finish of the sheets forming heat screens of the aircraft wheel 1 and positioned at the interface between the first rim half 3a and the second rim half 3b.

The spacer 9 presents high stiffness in compression, typically greater than or equal to 193,000 megapascals (MPa). The faces of the spacer 9 present a coefficient of friction that is low, typically lying in the range 0.12 to 0.18 (and advantageously close to 0.15), together with arithmetic average roughness Ra that is less than 0.8.

The small thickness of the spacer 9 enables the spacer 9 to be installed in an aircraft wheel 1 without any need to modify the interfaces of the aircraft wheel 1 (rim, assembly bolts, etc.).

The spacer 9 can thus not only be mounted on an aircraft wheel 1 for which the rim 2 has just been fabricated without any need to modify said rim 2, but it can also be mounted on an aircraft wheel 1 that is already in service on an aircraft and that presents signs of fretting.

The low arithmetic average roughness Ra of the spacer facilitates sliding between the faces of the spacer 9 and the bearing surfaces 7, and makes it possible to avoid paint being torn away from the surfaces as a result of the above-mentioned radial and peripheral micro-movements.

This serves to protect the bearing surfaces 7 by facilitating the radial and peripheral micro-movements, rather than attempting to prevent them by clamping the first rim half 3a and the second rim half 3b together more strongly.

There follows a description of an aircraft wheel in a second embodiment of the invention. In the second embodiment of the invention, it is desired to eliminate the sliding and the radial and peripheral micro-movements in order to avoid the phenomenon of fretting and under tension, which damages the bearing surfaces of the first rim half and of the second rim half. For this purpose, the coefficient of friction between the spacer and the bearing surfaces of the first rim half and of the second rim half is increased.

In this embodiment, each face of the spacer is coated in diamond powder, thereby imparting a large coefficient of friction to the faces of the spacer (greater than 0.19).

At the time of fabrication of the first rim half and of the second rim half, each bearing surface is likewise treated with anodizing of the sulfuric acid anodizing (SAA) type.

Each bearing surface is also protected by a coating that serves to avoid a galvanic couple forming. By way of example, the coating may comprise a paste based on solid lubricants and including a mineral oil (e.g. the product Molykote® G-Rapid Plus is used).

Naturally, the invention is not limited to the embodiments described, and covers any variant coming within the ambit of the invention as defined by the claims.

Naturally, the shape of the spacer may be different from the shape shown herein.

By way of example, the spacer may comprise a plurality of portions, each forming a sector of the spacer.

The spacer may also be fabricated out of a different material. It is thus possible to use a different stainless steel (e.g. a stainless steel of the X8CrNi18-08 type).

In the first embodiment of the invention, the spacer may in particular be in the form of a sticker of very small compressibility and having a free surface that presents a very small coefficient of friction.

The spacer may also be made of an organic or synthetic material that possesses suitable stiffness and surface state (for example it is possible to use a tape comprising a backing made of glass fiber impregnated with polytetrafluoroethylene (PTFE) and a silicone adhesive).

In the second embodiment, each face of the spacer may be coated with a different coating, e.g. of ceramic powder.

Furthermore, the bearing surfaces are not necessarily coated in a layer of primer paint and a layer of finish paint. In particular, the bearing surfaces need not be coated, or they may be coated in a layer of primer paint only.

The invention claimed is:

1. An aircraft wheel including:
   a rim (2) comprising two assembled-together rim halves (3a, 3b), each rim half (3a, 3b) having a bearing surface (7) extending in a plane perpendicular to an axis of rotation (X) of the aircraft wheel, and
   a spacer (9) situated between the two bearing surfaces (7) when the rim halves (3a, 3b) are assembled together,
   wherein the spacer is extended over a whole of each bearing surface so that the surface of the spacer (9) and the bearing surface (7) of each rim coincide.

2. The aircraft wheel according to claim 1, wherein the spacer (9) is in the form of a flat ring.

3. The aircraft wheel according to claim 2, wherein the spacer (9) includes undulations (10) oriented towards the center of the spacer, said spacer undulations extending over corresponding undulations (8) formed on a bearing surface of a rim half when the rim halves are assembled together.

4. The aircraft wheel according to claim 1, wherein the spacer presents thickness lying in the range 0.05 mm to 0.25 mm.

5. The aircraft wheel according to claim 1, wherein the spacer is held in angular position by an assembly bolt (12) for assembling together the rim halves, the assembly bolt extending through the spacer.

6. The aircraft wheel according to claim 1, wherein the spacer comprises a plurality of portions, each forming a sector of the spacer.

7. The aircraft wheel according to claim 1, wherein the spacer (9) presents stiffness in compression that is greater than or equal to 193,000 MPa.

8. The aircraft wheel according to claim 1, wherein faces of the spacer (9) present a coefficient of friction lying in the range 0.12 to 0.18.

9. The aircraft wheel according to claim 1, wherein faces of the spacer present a coefficient of friction that is greater than 0.19.

10. The aircraft wheel according to claim 1, wherein faces of the spacer (6) present an arithmetic average roughness Ra that is less than 0.8.

11. The aircraft wheel according to claim 1, wherein the spacer (9) is made of stainless steel.

12. The aircraft wheel according to claim 11, wherein the stainless steel is of the X5CrNi18-10 (304L) type or of the X8CrNi18-08 type.

13. The aircraft wheel according to claim 1, wherein the spacer (9) is made of an organic or synthetic material.

14. The aircraft wheel according to claim 1, wherein the spacer (9) is in the form of a sticker.

15. The aircraft wheel according to claim 1, wherein faces of the spacer are coated in diamond powder or in ceramic powder.

16. The aircraft wheel according to claim 1, wherein the bearing surfaces (7) are treated with SAA type anodization.

17. The aircraft wheel according to claim 1, wherein the bearing surfaces (7) are coated in a layer of primer paint and a layer of finish paint.

18. The aircraft wheel according to claim 1, wherein the bearing surfaces (7) are protected by a coating for avoiding the formation of a galvanic couple, and including a lubricant.

* * * * *